Patented June 3, 1941

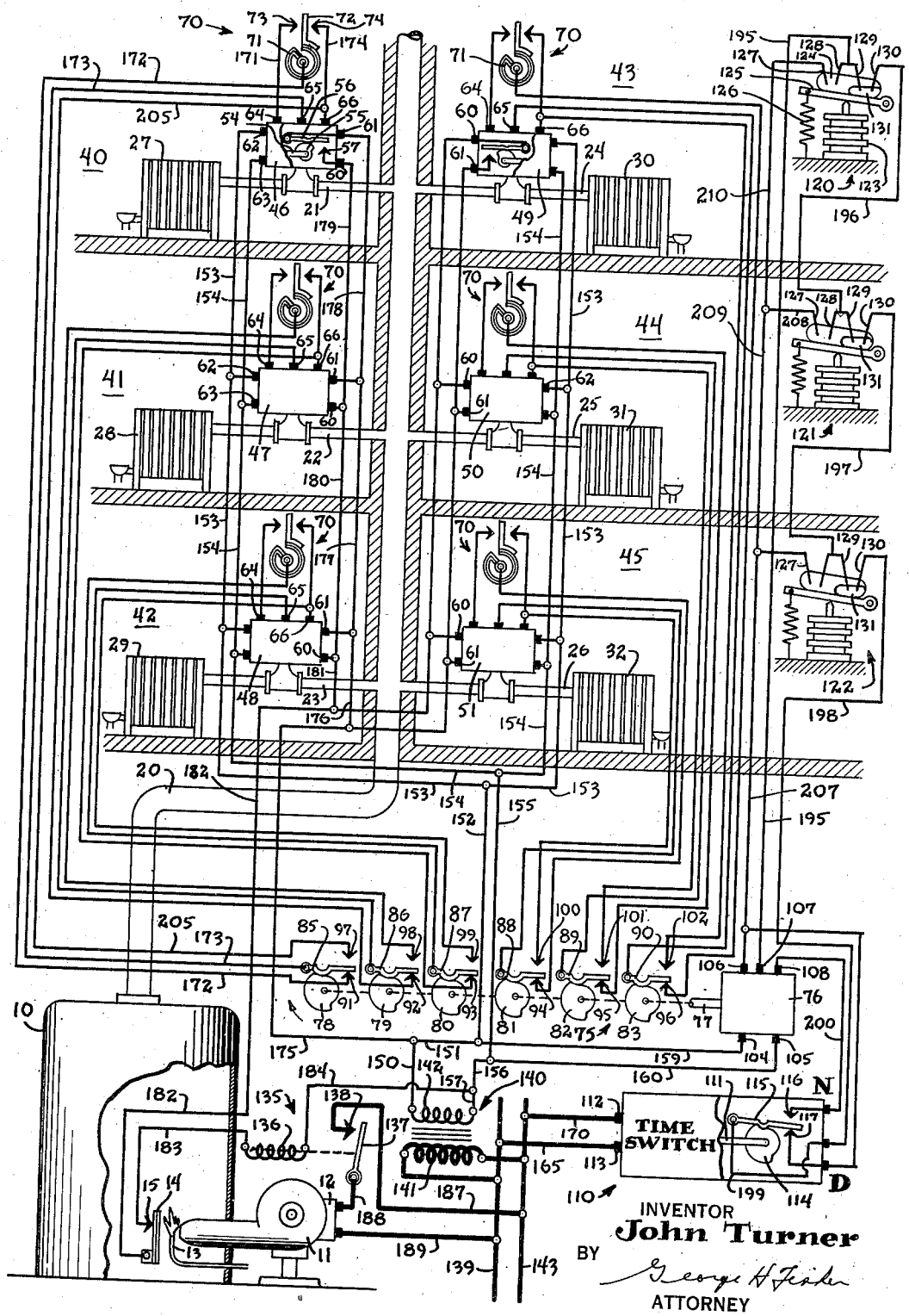

2,244,584

UNITED STATES PATENT OFFICE 2,244,584

ZONE TEMPERATURE CONTROL SYSTEM

John Turner, Boston, Mass., assignor to Minneapolis-Honeywell Regulator Company, Minneapolis, Minn., a corporation of Delaware Application August 20, 1937, Serial No. 160,106

3 Claims. (Cl. 236—46)

This invention relates to a zone temperature control system and more particularly to one in which provision is made for varying the temperature during certain predetermined desired periods.

In the ordinary zone temperature control system, it is the customary practice to provide some temperature controlling means in each of the individual zones. This commonly consists of either a valve regulating the steam to a radiator or in the zone or a damper regulating the admission of warm air to the zone, the valve or damper, as the case may be, being controlled by a zone thermostat. In such systems it is often desirable to maintain a different temperature during certain periods of the time, particularly during the night. Various arrangements have been provided whereby a lower night temperature is maintained in all of the zones. Oftentimes this has taken the form of a separate thermostat for each zone, the second thermostat being set at a desired night value. It has also been proposed to provide a central thermostat at some one point which takes control of the heating plant at night and controls in accordance with the temperature near the main thermostat regardless of what temperature may exist in any one zone. Such a system is apt to be very dangerous since if the region in which the main thermostat is located is subjected to an abnormal condition such as a window being open, it is possible for some of the other zones to be excessively overheated. It is obviously impossible to insure that the heat loss conditions in the zone in which the night thermostat is located will always have the same relation to the heat loss of the individual zones as normally exists during the day.

An object of the present invention is to provide a zone temperature control system in which control is taken away from the zone temperature regulators during desired periods and is restored during the time that the temperature at any one of several selected points decreases beyond a desired value.

A further object of the present invention is to provide a zone temperature control system in which a centrally located thermostat shuts off all of the individual heating controls in the zones when it is satisfied and upon a call for heat transfers all of these controls to individual zone thermostats which function as individual high limit controls for the zones.

Further objects of the present invention will be apparent from the accompanying specification, claims and drawing.

In the single figure of the drawing, the present invention is shown in a schematic form.

Reference is now made to the drawing for a more detailed understanding of the present invention. The invention has been shown as applied to a heating system although it is to be understood the invention is applicable to any type of temperature control system. In the illustrative embodiment, the heating plant is shown as comprising a steam boiler indicated by the reference numeral 10. An oil burner 11 is used as the heating unit of the boiler. This oil burner is of any conventional type having a motor 12, only the terminal plate of which is shown. A pilot burner 13 is associated with the oil burner and serves to ignite any fuel issuing therefrom. Associated with the pilot burner is a safety pilot switch consisting of a bimetallic element 14 adapted to engage contact 15 when the bimetallic element is heated by the pilot flame. As will be more apparent from the subsequent description, the safety pilot thermostat serves to prevent operation of the oil burner whenever the pilot burner is extinguished.

Leading from the boiler 10 is a steam supply pipe 20 which is provided with a plurality of branch pipes 21, 22, 23, 24, 25 and 26 leading to radiators 27, 28, 29, 30, 31, and 32. The condensed steam is returned from the radiators through any suitable means (not shown). Each of the radiators 27 to 32 is located in a different zone, the zones being indicated generally by the reference numerals 40 to 45. If desired, the radiators may each have associated therewith a fan and an enclosing casing to form what is commonly referred to as a "unit heater." The flow of steam to each of the radiators 27 to 32 is controlled by a motorized valve, these valves being assigned the reference numerals 46 to 51, respectively. Each of these valves may be of any suitable type provided with a motor, a reduction gear train, and switching mechanism whereby upon closing of one motor circuit, the motor is rotated through 180° to close the valve, and upon closing of a second circuit, it is rotated through another 180° to open the valve, and in which a switch is provided which is open whenever the valve is closed and vice versa. A valve particularly suitable for this purpose is that disclosed in the co-pending application of Carl G. Kronmiller Serial No. 15,965, filed April 12, 1935, now Patent No. 2,146,680, Feb. 7, 1939. For a detailed understanding of the construction of the valve, reference is made to this application.

As previously stated, each of the valves is provided with a switch which is opened when the valve is closed or vice versa. The switches of valves 46 and 49 have been indicated in the drawing. Referring to valve 46, it will be noted that there is a shaft 54, which shaft is driven by the motor as the valve is opened and closed. Secured to this shaft 54 is a cam 55, which cam is adapted to control the position of a switch blade 56 which in turn cooperates with a fixed contact 57. The switch is in the position assumed when the valve is closed. Upon the valve being moved to open position, the shaft 54 is rotated 180° in a direction such as to cause counter-clockwise movement of the cam 55. This counter-clockwise movement of cam 55 permits the cam follower of switch blade 56 to ride down upon the heel portion of the cam and thus permit switch blade 56 to engage contact 57. Contact 57 is connected to a terminal 60 and the switch blade 56 is connected to a terminal 61. Thus, whenever the valve is moved from closed position, terminals 60 and 61 are electrically connected. Also associated with the valve are terminals 62 and 63. These terminals constitute the power terminals of the valve operating mechanism and are connected to a suitable source of power to be referred to later. Also associated with the valve are terminals 64, 65 and 66. These three terminals constitute the thermostat terminals of the valve. When terminals 64 and 65 are connected together, the valve is moved to open position and when terminals 65 and 66 are connected together, the valve is moved to closed position. For purposes of clarity in the subsequent description, the corresponding terminals of valves 47, 48, 49, 50, and 51 have been assigned the same reference numerals as those of valve 46. Thus in each case the auxiliary switch terminals have the reference numerals 60 and 61, the power terminals the reference numerals 62 and 63, and the thermostat terminals the reference numerals 64, 65 and 66. For greater clarity in illustration, however, the relative position of the power and auxiliary switch terminals of the valves 49 to 51 is opposite to that of the corresponding terminals of valves 46 to 48.

Associated with each valve is a room thermostat indicated by the reference numeral 70. This thermostat may be of any conventional type shown as comprising bimetallic element 71 to which is secured a contact arm 72. The bimetallic element is so arranged that upon a temperature drop, it is adapted to move the contact arm 72 into engagement with a contact 73, and upon a temperature rise into engagement with a contact 74. Contact 73 may be referred to as the "cold contact" and contact 74 as the "hot contact."

A motor operated transfer switch is generally designated by the reference numeral 75. This switch comprises a two-position reversible motor 76 which drives a cam shaft 77 to which is secured a plurality of cams 78, 79, 80, 81, 82 and 83. Each of the cams 78 to 83 has a switch blade associated therewith, the switch blades being designated by the reference numerals 85 to 90, respectively. In the position in which the cam shaft 77 is shown in the drawing, switch blades 85 to 90 are in engagement with contacts 91 to 96, respectively. Upon the cam shaft 77 being rotated in a clockwise direction through a predetermined angle, all of the switch blades 85 to 90 are caused to ride upon the toe portions of the respective cams and are raised into engagement with contacts 97 to 102, respectively. The motor 76 is provided with two terminals 104 and 105 which are adapted to be connected to a suitable source of power to supply power for the operation of the motor. The motor is also provided with three terminals 106, 107, and 108 which are adapted to be connected to a controlling circuit. The motor assumes the position shown when contacts 106 and 107 are connected together. Upon contacts 107 and 108 being connected together, the motor is energized in the opposite direction to rotate shaft 77 in a clockwise direction until the switch blades 85 to 90 engage the upper contacts 97 to 102, respectively.

The energization of the motor operated transfer switch 75 is controlled in part by a time switch 110. This time switch may be of any suitable form which is adapted to actuate a switch blade to one position during one predetermined period and to another position during a different predetermined period. In view of the fact that such time switches are quite conventional in the art, only the switch portion thereof has been shown. Forming a part of this switch mechanism is a cam shaft 111 which, it is to be understood, is driven through a reduction gear train by a synchronous motor, the power to which is supplied through terminals 112 and 113. Secured to the cam shaft 111 is a cam 114, which cam actuates a switch blade 115, which in turn cooperates with contacts 116 and 117. The time switch is in the position occupied during the day in which the switch blade 115 is in engagement with contact 117. Continued rotation of shaft 111 is effective through the action of cam 114 to move the switch blade 115 into engagement with the upper contact 116. The switch is so adjusted that switch blade 115 engages contact 116 during a desired period of the night.

Also controlling the operation of the motor operated transfer switch 75 are a plurality of low limit thermostats 120, 121, and 122. Each of these thermostats consists of a temperature sensitive element 123, which is shown for purposes of illustration as a bulb filled with some volatile fluid, the temperature sensitive element 123 being designed to actuate a mercury switch 124. Mercury switch 124 is carried upon a pivoted lever 125 against which the bellows 123 bears. A spring 126 is constantly opposing the action of the bellows 123. Mercury switch 124 is provided with contacts 127, 128, 129, and 130. A mercury element 131 is located within the switch and is adapted to bridge either electrodes 127 and 128 or electrodes 129 and 130. In the position of the thermostatic device 120 as shown in the drawing, the electrodes 129 and 130 are bridged by the mercury element 131. This is the position assumed by the thermostat when the temperature is above the value for which it is set. Upon this temperature decreasing sufficiently, the spring 126 is effective to rotate the switch support 125 in a counterclockwise direction permitting the mercury 131 to move out of engagement with contacts 129 and 130 and into engagement with contacts 127 and 128. It is to be understood that the switch is so designed that the mercury 131 must bridge either contacts 129 and 130 or contacts 127 and 128. In other words, there is never an intermediate position in which neither one of the two sets of contacts is electrically connected.

Each of the thermostats 120 is associated with a different group of zones. While it is to be understood that the zones may be arranged in any desired manner and are not limited in number, there have been shown for purposes of illustration six zones divided into three groups of two. Furthermore, each group of zones is shown as being located on the same floor. Thus one group of zones consists of the zones 40 and 43 which are heated by radiators 27 and 30, respectively. Associated with this group of zones is a low limit thermostat 120. A second group of zones consists of zones 41 and 44, and associated with this group of zones is the low limit thermostat 121. The third group of zones consists of the zones 42 and 45. The low limit thermostat for this group of zones is the thermostat 122.

A relay 135 is provided for the purposes of controlling the oil burner. This relay consists of a relay coil 136 associated with a relay switch blade 137, which switch blade is in turn adapted to cooperate with a contact 138. Switch blade 137 is biased out of engagement with contact 138, but upon energization of the relay coil is adapted to be moved into engagement with contact 138 against its bias.

A step-down transformer 140 is provided for the purpose of supplying low voltage power to the various pieces of apparatus with the exception of the oil burner and the time switch. This step-down transformer consists of a line voltage primary 141 connected to line wires 139 and 143 leading to a suitable source of power (not shown). Also forming a part of the step-down transformer 140 is a low voltage secondary 142. This secondary 142 is connected to power terminals 62 and 63 of the various valves 46 to 51 by conductors 150, 151, 152, 153, 154, 155, 156, and 157. Thus, each of the valves 46 to 51 is supplied with power for operation of the same from the low voltage secondary 142. The secondary 142 is also connected to the power terminals 104 and 105 of the motor 76 through conductors 150, 151, 159, 160, 156 and 157.

The power terminals 112 and 113 of the time switch 110 are connected to the line wires 139 and 143 by conductors 165 and 170.

*Operation*

The apparatus is shown in the drawing in the position which it assumes during the day when the temperature in all of the zones is actually at the desired point. Let it be assumed now that the temperature in zone 40, for example, decreases. The effect of such decrease, as previously pointed out, is to cause the contact arm 72 to move into engagement with contact 73. As soon as this occurs, a circuit is established between terminals 64 and 65 of the valve 46 as follows: from terminal 64 through conductor 171, contact 73, contact arm 72, bimetallic element 71, conductor 172, contact 91 of the transfer switch 75, switch blade 85, and conductor 173 to terminal 65. It will be noted that the establishment of the above traced circuit connects terminals 64 and 65. The connection of these terminals results in the energization of the motor so as to cause the valve to move to open position.

At the same time that the valve is moved to open position, the cam 55 is rotated to a point permitting the switch blade 56 to engage the contact 57. When this takes place, a circuit is established to relay coil 136 as follows: from the left-hand terminal of secondary 142 through conductors 150, 175, 176, 177, 178, terminals 61 and 60, conductors 179, 180, 181, 182, bimetallic element 14, contact 15, conductor 183, relay coil 136, and conductors 184 and 157 to the other terminal of secondary 142. The energization of relay coil 136 causes the switch blade 137 to be moved into engagement with contact 138. As soon as this takes place, a circuit is established to the oil burner as follows: from line wire 143 through conductor 187, contact 138, switch blade 137, conductor 188, oil burner motor 12, and conductor 189 to the other line wire 139. The placing into operation of the oil burner causes steam to be generated in the boiler 10, which steam by reason of valve 46 being opened is delivered to the radiator 27 from whence it is returned to the boiler by any suitable piping (not shown).

The admission of steam to the radiator 27 causes the temperature in zone 40 to rise. This rise in temperature will eventually be sufficient to cause contact arm 72 of thermostat 70 to be moved into engagement with contact 74. When this occurs, a circuit will be established between thermostatic contacts 66 and 65 as follows: from contact 66 through conductor 174, contact 74, contact arm 72, bimetallic element 71, conductor 172, contact 91 of the transfer switch 75, switch blade 85, and conductor 173 to the terminal 65. The establishment of this circuit causes the valve to move to closed position, thus shutting off the supply of steam to the radiator 27. At the same time, the cam 155 is again rotated 180° to the position shown in the drawing, in which position switch arm 56 is separated from contact 57. The separation of switch blade 56 from contact 57 interrupts the previously traced circuit to relay coil 136 and in this manner terminates operation of the oil burner.

While the operation has been described in connection with a single zone, it is to be understood that the operation is similar for any of the other zones. Instead, however, of merely one valve being open at a time, it is normal in a large installation that at least one or more of the valves somewhere in the building will be open at any one time, particularly in colder weather, so that the oil burner remains in operation a good portion of the time.

In view of the fact that the operation for the several zones is identical, it is believed unnecessary to trace in detail the controlling circuit for each zone. It is believed that the equivalency of the various circuits will be obvious by pointing out that the circuit between the terminal 65 of each motorized valve and the bimetallic element 71 of its associated zone thermostat is controlled in each case by one of the switches of the transfer switch 75. Thus, a switch constituted by switch blade 90 and contact 96 controls the connection between terminal 65 of motorized valve 49 and the bimetallic element 71 of the associated zone thermostat 79. The switch constituted by switch blade 88 and contact 94 functions in a similar manner in connection with the control circuit of motorized valve 51. Since the terminal 65 is common to both the closing and opening circuits of the motorized valve, it will be apparent that the operation of the valve by the thermostat 72 is dependent upon the switch blades 85 to 90 being in engagement with their lower contacts 91 to 96, respectively. As soon as these switch blades are separated from these lower contacts, the circuit between the common terminals of each motorized valve and its associated zone thermostat is interrupted.

The operation which has been described so far is the normal operation occurring during the day. Let it now be assumed that the time switch 110 causes the switch arm 115 to be moved out of engagement with contact 117 and into engagement with contact 116. As soon as this takes place, a circuit is established between contacts 107 and 108 as follows: from terminal 107 through conductor 195, contact 129, mercury 131 and contact 130 of limit switch 120, conductor 196, the contact 129, mercury 131, and the contact 130 of limit switch 121, conductor 197, the contact 129, mercury 131 and the contact 130 of limit switch 122, conductor 198, conductor 199, contact arm 115, contact 116, and conductor 200 to terminal 108 of motor 76. The establishment of this circuit between terminals 107 and 108 has as its effect the connection of these two terminals which, as previously stated, results in motor 76 being operated in a reverse direction to cause the engagement of switch blades 85 to 90 with the upper contacts 97 to 102, respectively. As soon as the switch blades 85 and 90 have been so moved, the system is ready for night operation. In tracing the circuit between terminals 107 and 108, it will be noted that the circuit was based upon the contacts 129 and 130 in all of the thermostats 120, 121, and 122 being connected by the mercury elements 131. This condition would always exist since the thermostats 120, 121, and 122 are set to operate at a very much lower value than the zone thermostats 70. Thus, at the time that the time switch first turns over, the temperatures in all of the zones 40 to 45, including those zones in which the low limit thermostats 120 to 122 are located, will be much higher than that at which thermostats 120 to 122 are set. Accordingly, all of these latter thermostats will be "satisfied".

The moving of switch blades 85 to 90 out of engagement with the lower contacts 91 to 96 results, in each instance, in the interruption of the controlling circuit between the motorized valve and the zone thermostat 70, since, as previously pointed out, the engagement of switch blades 85 to 90 with their lower contacts is a necessary condition to the establishment of a circuit between the common terminal 65 of each of the motorized valves and the bimetallic element 71 of the associated zone thermostat 70. The moving into engagement of the switch blades 85 to 90 with the upper contacts 97 to 102 results in each case in the establishment of a circuit between the contacts 65 and 66 of the motorized valve. This circuit will be described in conjunction with the motorized valve 46 of zone 40 and in this case is as follows: from terminal 65 through conductor 173, switch blade 85, contact 97, and conductor 205 to the other terminal 66. It will be noted from the previous description that the connection of terminals 65 and 66 results in the valve being moved to closed position. Since in each case the valve is moved to closed position, all of the auxiliary switches constituted by the switch blades 56 and the contact 57 will be moved to open position so that the oil burner will be placed out of operation.

With all of the valves closed and the oil burner placed out of operation, the temperature in the various zones will begin to fall. This decrease in temperature will continue until eventually the temperature adjacent one of the thermostats 120 to 122 will drop to the point where this thermostat moves from the position shown in the drawing to a position in which it is calling for heat. Let it be assumed that the intermediate thermostat 121 is the first thermostat to call for heat, that is, to move to a position in which the contacts 127 and 128 thereof are bridged by the mercury element 131 thereof. When this takes place, a circuit is established between terminals 106 and 107 of the motor 76 as follows: from terminal 106 through conductors 207, 209, and 208, electrode 127, mercury 131, and electrode 128 of thermostat 121, conductor 196, electrode 130, mercury 131 and electrode 129 of thermostat 120 and conductor 195 to terminal 107. If it is the thermostat 120 that first calls for heat, the following circuit will be established between terminals 106 and 107 of motor 76: from terminal 106 through conductors 207, 209, and 210, electrode 127, mercury 131 and electrode 128 of switch 124, and conductor 195 to terminal 107. The circuit between terminals 106 and 107 established if thermostat 122 is the first to call for heat is sufficiently obvious that it is believed unnecessary to specifically trace the same.

The establishment of any of these circuits between terminals 106 and 107 causes the motor 76 to move in a direction opposite to the arrow at the end of the cam shaft, moving the cam shaft 77 back to the position shown in the drawing. Moving of cam shaft 77 back to its original position causes switch blades 85 to 90 to move out of engagement with their upper contacts 97 to 102 and into engagement with the lower contacts 91 to 96. This causes the various motorized valves 46 to 51 to be returned to the control of their associated zone thermostats 70. At the same time, the circuits between terminals 65 and 66 which had been established as a result of the switch blades 85 to 90 being moved into engagement with their upper contacts are interrupted.

By the time that the temperature adjacent one of the low limit thermostats 120 to 122 has dropped to a point where this thermostat calls for heat, it is assured that at least one if not all of the zone thermostats 70 will be calling for heat inasmuch as these thermostats are set to maintain a very much higher temperature than the low limit thermostats 120 to 122. Accordingly, at least one, if not all, of the valves 46 to 51 will be moved to open position and at the same time the oil burner will be placed in operation as a result of the auxiliary switch associated with the valves 46 to 51 being closed. The turning on of the oil burner again causes a generation of steam which is supplied to those radiators in those zones in which the temperature is below the normal day setting. The result of the operation of the heating plant and the supplying of the steam to some, if not all, of the radiators is that the temperatures in the various groups of zones will begin to rise. This rise in temperature will eventually cause the temperature adjacent the low limit thermostat to similarly rise to the point where this thermostat becomes satisfied, the mercury element 131 moving into bridging engagement with the electrodes 129 and 130 thereof. It is to be understood that this will normally occur long before any one of the zone thermostats 70 is satisfied. As soon as all of the low limit thermostats are satisfied in this manner, the circuit previously traced between terminals 107 and 108 of the motor 76 will be reestablished providing that the time switch is still in the position in which switch blade 115 is in engagement with contact 116. The reestablishment of this circuit causes the motor to rotate the cam shaft 77 back to the position in which the switch blades 85 to 90 will again be in engagement with contacts 97 to 102, at which time all of the motorized valves 46 to 51 are no longer under the control of the zone thermostats 70 and are all in closed position.

It will be readily seen from the foregoing description that during the day each of the zone thermostats controls its respective valve to maintain a uniform temperature in its zone. At night, all of the zone valves are closed and the control of the zone valves by the zone thermostats is interrupted. As soon, however, as any one of the low limit thermostats calls for heat, the various zone valves are automatically restored to the control of the zone thermostats whereupon the heating system is again placed in operation until such time as all of the low limit thermostats are satisfied. In this manner, it is assured that the temperature in any one zone can never rise excessively even though abnormal conditions may exist in the region in which the low limit thermostat is located. In other words, during the day the individual zone thermostats act as the sole means of temperature control, while at night the various low limit controls actually constitute the main means of controlling the temperature while the various zone thermostats constitute high limit controls. It is, moreover, to be understood that while I have shown this system as operating so that the control of the heating plant by a few centrally located thermostats with auxiliary high limit control by zone thermostats occurs only during the night, this system of control may be used for the entire twenty-four hours, if desired. Under such circumstances, the thermostats 120 to 122, which in the foregoing discussion have been designated as low limit thermostats, would be set at the desired day temperature while the zone thermostats 70 would be set to maintain a temperature slightly higher than this. In this way, the heating plant would be controlled by one or two centrally located thermostats with the assurance that the temperature in any one zone can never exceed the desired maximum value.

While the system has been shown as employing one low limit thermostat for each floor, it is to be understood that it would be possible in certain cases to employ only one low limit thermostat for the entire building. In general, while I have shown a specific embodiment of my invention for purposes of illustration, it is to be understood that the invention is limited only by the scope of the appended claims.

I claim as my invention:

1. In a zone temperature control system, a plurality of zones whose temperature is to be controlled, a temperature changing means in each of said zones, a motor operated regulator for said temperature changing means, said regulator having a three wire control circuit and operative when first and second wires of said control circuit are connected to move to a first position in which the temperature changing effect of said temperature changing means is increased and when the second and third wires of said control circuit are connected to move to a second position in which the temperature changing effect of said temperature changing means is decreased, a three wire thermostat in each zone connected to said control circuit, a cycling single pole double-throw switch associated with each circuit, said switch being operative in a first position to place the associated thermostat in control and in a second position to connect the second and third wires of said regulator circuit to cause said regulator to move to said second position, motor means associated with said cycling switches and operative simultaneously to move all of said switches between the two positions thereof, a time switch in control of said motor means, and a further thermostat in one of said zones also in control of said motor means, said further thermostat being set to maintain a different temperature than said previously named thermostat and operable when said different temperature exists thereat to cause said motor means to move said cycling switches to said first position to place said individual zone thermostats in control of said temperature changing means.

2. In a zone temperature control system, a plurality of zones whose temperature is to be controlled, a heating means in each of said zones, a motor operated regulator for said heating means, said regulator having a three wire control circuit and operative when first and second wires of said control circuit are connected to move to a first position in which the heating effect of said heating means is increased and when the second and third wires of said control circuit are connected to move to a second position in which the heating effect of said heating means is decreased, a three wire thermostat in each zone connected to said control circuit, a cycling single pole double-throw switch associated with each circuit, said switch being operative in a first position to place the associated thermostat in control and in a second position to connect the second and third wires of said regulator circuit to cause said regulator to move to said second position, motor means associated with said cycling switches and operative simultaneously to move all of said switches between the two positions thereof, a time switch in control of said motor means, and a further thermostat in one of said zones also in control of said motor means, said further thermostat being set to maintain a different temperature than said previously named thermostat and operable when the temperature thereat drops to said different temperature to cause said motor means to move said cycling switches to said first position to place said individual zone thermostats in control of said heating means.

3. In a zone temperature control system, a plurality of zones whose temperature is to be controlled, an electrically controlled central heating plant for heating a fluid medium, a heating means in each of said zones, means for circulating the heated fluid medium to the various heating means, a regulator associated with each heating means for controlling the flow of fluid medium to said heating means, said regulator having a three wire control circuit and operative when first and second wires in said control circuit are connected to assume a maximum flow position and when the second and third wires of said control circuit are connected to move to a minimum flow position, an auxiliary switch associated with each of said regulators, means interconnecting said auxiliary switches and said heating plant and effective upon any one of said regulators moving from its minimum flow position to place said heating plant in a heat increasing condition, a three wire thermostat in each zone and connected to said control circuit, a cycling single-pole double-throw switch associated with each circuit, said switch being operative in a first position to place the associated thermostat in control and in a second position to connect the second and third wires of said regulator circuit to cause said regulator to move to said second position, motor means associated with said cycling switches and operative simultaneously to move all of said switches between the two positions thereof, a time switch in control of said motor means, and a further thermostat in one of said zones also in control of said motor means, said further thermostat being set to maintain a different temperature than said previously named thermostat and operable when the temperature thereat drops to said different temperature to cause said motor means to move said cycling switches to said first position to place said individual zone thermostats in control of said heating means.

JOHN TURNER.